United States Patent [19]

Rutledge

[11] Patent Number: 4,649,034
[45] Date of Patent: Mar. 10, 1987

[54] CATALYZED FLUE GAS DESULFURIZATION
[75] Inventor: Gerald D. Rutledge, McMurray, Pa.
[73] Assignee: Conoco Inc., Wilmington, Del.
[21] Appl. No.: 744,729
[22] Filed: Jun. 14, 1985
[51] Int. Cl.$^4$ ............................ B01J 8/00; C01B 17/00
[52] U.S. Cl. ..................................... 423/244; 110/343; 110/345
[58] Field of Search .......... 423/244 A, 242 A, 244 R, 423/242 R; 110/343, 345

[56] References Cited

U.S. PATENT DOCUMENTS 4,330,512 5/1982 Lindstrom ............................ 423/244
4,356,670 9/1982 Matsuda et al. ..................... 423/244

FOREIGN PATENT DOCUMENTS 56-45748 4/1981 Japan ..................................... 423/244
2010793 7/1979 United Kingdom ................. 423/244

Primary Examiner—Gregory A. Heller
Attorney, Agent, or Firm—Cortlan R. Schupbach

[57] ABSTRACT

Flue gas resulting from combustion of sulfur-containing fuel is treated for reduction of its sulfur dioxide content by creating in it a suspension of finely divided sorbent such as lime, and then contacting it at elevated temperature in a vertical contacting zone with a descending shower of sulfur dioxide oxidation catalyst. The resulting sulfur trioxide is captured as a powdered sulfate.

6 Claims, 1 Drawing Figure

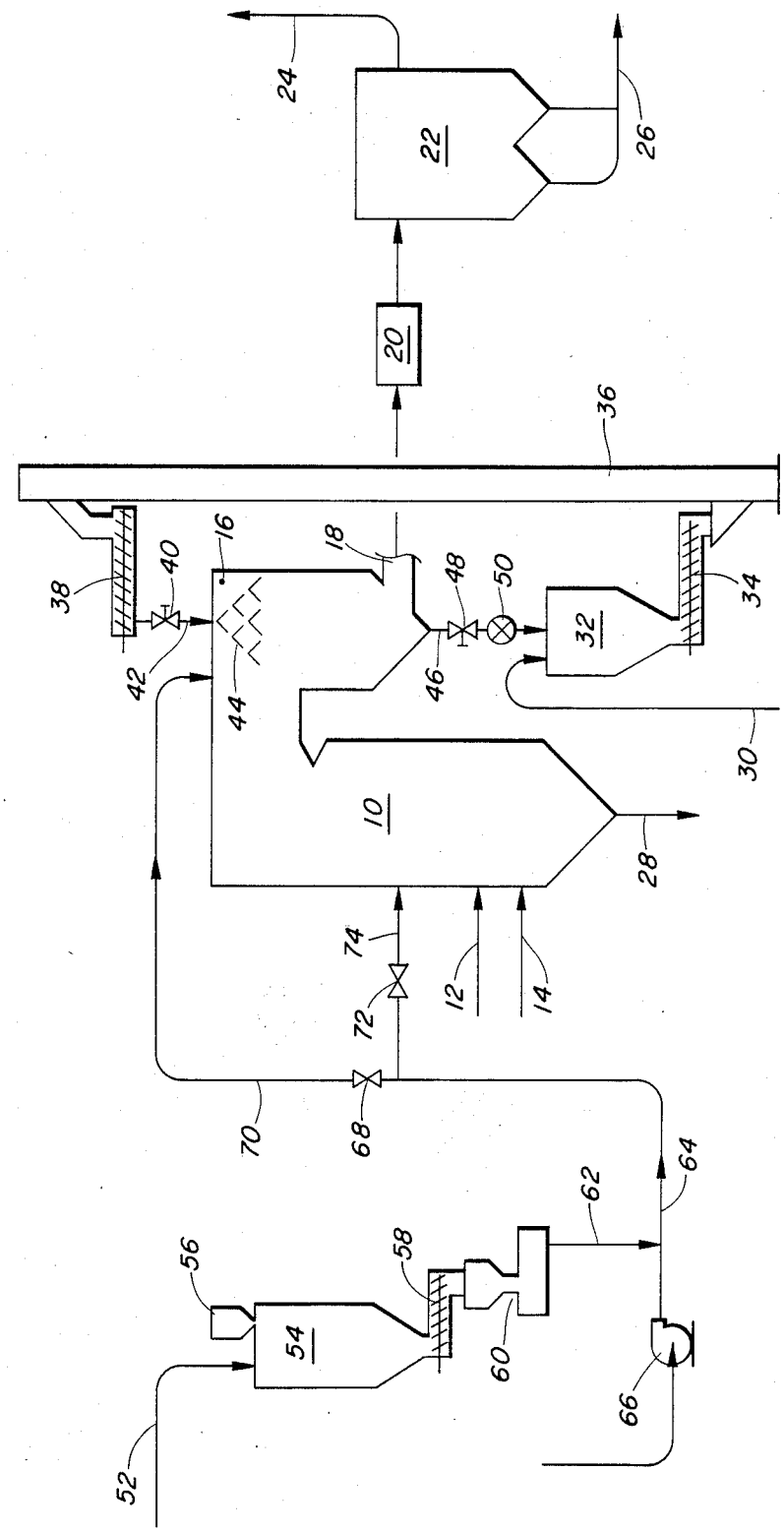

CATALYZED FLUE GAS DESULFURIZATION

FIELD OF THE INVENTION

This invention relates to a method for reducing the sulfur content of gases resulting from combustion of a sulfur-containing fuel by dry chemistry involving catalytic oxidation of sulfur dioxide to sulfur trioxide and reaction of the latter with an alkaline earth oxide to form the corresponding sulfate. The catalytic oxidation is effected by showering granular catalyst downwardly through the convection section of the combustor (boiler).

BACKGROUND OF THE INVENTION

Efforts to reduce sulfur emissions in the gaseous products from combustion of a sulfur-containing fuel have been made in varying directions. Some processes attempt to reduce or eliminate the sulfur in the fuel prior to its combustion. Other processes propose the addition of compounds to the combustion zone which will in some manner change the nature of the sulfur compounds such that they may be more readily removed from the combustion products. And yet other processes remove sulfur compounds from the gaseous combustion products by chemical reaction.

U.S. Pat. No. 4,185,080, issued Jan. 22, 1980 to Rechmeier discloses a combustion gas desulfurization process wherein a powdered sorbent such as limestone or dolomite is added to a combustion zone, and a portion of the solids collected from the flue gas is reactivated and can be returned for injection into or downstream of the combustion zone.

The approach of chemical treatment to effect flue gas desulfurization can be further subdivided into wet scrubbing wherein a solution or suspension of reagent both enters and leaves the flue gas contacting zone in liquid state, spray drying wherein a solution or suspension of reagent enters the flue gas contacting zone in liquid state but is dried to produce a powdered solid leaving the contacting zone, and dry treatment wherein the treating reagent is a solid state powder both entering and leaving the contacting zone.

U.S. Pat. No. 4,350,670, issued Sept. 21, 1982 to Matsuda et al discloses a dry treatment of flue gas containing dust and sulfur dioxide by contacting the flue gas with an oxidizing catalyst to form sulfur trioxide, which reacts with components of the dust to form a sulfate; if there is insufficient dust to absorb the sulfur trioxide, fine particles of alkaline earth oxides or carbonates can be added.

Finally, U.S. Pat. 4,330,512, issued May 18, 1982, to Lindstrom discloses treatment of flue gas by flowing it upwardly through a chimney in countercurrent contact with a shower of sorbent-coated balls.

Current thinking seems to be that no one of the above-discussed strategies is the unique answer to the sulfur emission problem, either for new installations or for retrofit on an existing installation. Rather, numerous site-specific factors such as proximity to reagent source, space availability, and extent of sulfur removal required, must enter into the selection at each plant.

SUMMARY OF THE INVENTION

According to the present invention, there is provided a novel and advantageous method of removing sulfur compounds, especially sulfur dioxide, from combustion exhaust gas. The method comprises oxidation of the sulfur dioxide to sulfur trioxide, in the favorable temperature regime generally prevailing in the convection section of a boiler, by circulating a shower of relatively large oxidation catalyst particles through that section, while simultaneously presenting to the gas stream relatively fine particles of a sulfur trioxide sorbent such as calcium oxide. The mixture of solids is readily separated in the lower region of the contact zone by size difference, with oxidation catalyst particles being recycled.

BRIEF DESCRIPTION OF THE DRAWING

In the drawing, the sole FIGURE represents a schematic flow diagram of a combustor installation according to the method of the present invention.

DETAILED DESCRIPTION OF THE INVENTION

The invention will now be further illustrated by reference to the drawing. A steam boiler 10 is provided with inlets for fuel and combustion air 12 and 14 respectively. In the region adjacent the combustion, temperatures as high as 1650° C. can be reached, and heat is transferred by radiant exchange. As the combustion products progress through the boiler, they gradually decrease in temperature, and pass through various banks of heat exchange tubes wherein the heat transfer is effected by convective exchange. Gas temperature can drop to e.g. 630°–750° C. at the point where typically the gases complete their horizontal run and begin their downward passage into the vertical convective section, shown as point 16. The gases exit the lower end of this section via a duct 18, at which point their temperature has dropped to e.g. as low as 300° C. They can be heat exchanged in air heater 20 to preheat combustion air for inlet 14, and are then passed to cleanup unit 22 and finally by way of duct 24 to a stack. Cleanup unit 22 can comprise for example a bag house or an electrostatic precipitator (ESP) to remove solids such as fly ash from the flue gas. Fine solids including fly ash are removed for disposal by way of conduit 26, and coarse ash is removed from the bottom of boiler 10 for disposal by way of conduit 28. The process as described to this point is conventional.

According to my invention, a particulate oxidation catalyst is circulated so as to shower downwardly through the reaction zone comprising the vertical convection section, i.e. from point 16 downward. The fresh catalyst begins its passage by being introduced as makeup by way of conduit 30 to a surge bin 32. The fresh catalyst plus recycle catalyst, as will be described, is withdrawn from bin 32 by a screw conveyor 34 to a bucket elevator 36, which lifts it to a suitable elevation above point 16. The catalyst then is carried by another conveyor 38 to a metering valve 40 in duct 42 into the top of the convection section. An air blower and lift pipe can be substituted for the bucket elevator to pneumatically convey the catalyst up and into the top of the boiler convection section if space for installation of the bucket elevator is limited. Here it is showered downward across distribution or spreader devices 44 which can comprise boiler tubes or e.g. angle iron. The catalyst achieves good contact with the flue gas during its fall, and collects in the bottom of the convection section, from which it is removed by a duct 46 containing a slide valve 48 and a rotary feeder 50, which helps move this recycled catalyst into surge bin 32. This catalyst comprises known oxidation catalyst such as vanadium pentoxide, ferric oxide, platinum, etc. on a particulate base such as alumina, and is preferably relatively coarse, e.g. in the size range of about 3 to about 16 mesh U.S. sieve. Such oxidation catalysts are known for example in manufacture of sulfuric acid by the contact process. Conversion equilibrium for oxidation of sulfur dioxide to sulfur trioxide is dependent upon the temperature and the oxygen concentration, i.e. the amount of excess air in combustion. Various catalysts produce peak conversion rates at differing temperature ranges, although the oxidation rate is generally too low to be useful at temperatures below about 415° C. Selection of a catalyst for the prevailing temperature rate and adjustment of excess air rate to control oxidation rate are within the skill of the art.

The second essential aspect of my invention resides in making available to the flue gas, contemporaneous with the oxidation reaction, an alkaline sorbent or getter reagent capable of tying up sulfur trioxide as it is formed. Such reagent most preferably comprises calcined lime, i.e. calcium oxide. In one embodiment, the calcined lime (quicklime) is provided to the process as such, and in a second embodiment, the process is provided with finely ground limestone or dolomite which is calcined within the present process. In either event, a suitable size consist is a fineness of at least about 70 weight percent minus 200 mesh U.S. Sieve. This material is provided to the process by way of conduit 52 to a storage bin 54, which can be vented through a dust filter 56. The sorbent passes by way of a conveyor 58 to a weigh feeder 60, which meters it by way of conduit 62 into a conveying air stream in duct 64 supplied by a blower 66. The suspension of sorbent powder in air which is transported in conduit 64 is introduced into the boiler at either of two general locations, depending on its composition. When lime is supplied via conduit 52, the suspension is passed by way of valve 68 and conduit 70 into the convection section just upstream of the catalyst from duct 42. When limestone or dolomite is supplied via conduit 52, the suspension is passed by way of valve 72 and conduit 74 into the radiant or high temperature zone of boiler 10. In this latter event, the limestone or dolomite is calcined during its passage through the high-temperature region of the boiler, as is known in the art, according to the reaction $CaCO_3 \rightarrow CaO + CO_2$.

Depending on the temperature profile in any particular boiler, the limestone can be added at one of several places. It can be pre-blended with the coal feed, and thus introduced through conduit 12. Or it can be introduced by way of separate ports in the coal injection nozzle or burner, the so-called 'LIMB' (limestone injected multistage burner). In most instances, the temperature profile will dictate injection of the limestone a short distance downstream of, i.e. above, the actual fireball in the boiler in order to avoid dead-burning. The net result of the procedure is to make available freshly calcined finely divided lime at the point where the catalysis of sulfur dioxide to sulfur trioxide is occurring, $2SO_2 + O_2 \rightarrow 2SO_3$, so that the lime will react as $CaO + SO_3 \rightarrow CaSO_4$.

The material flowing downwardly through the convection section, i.e. from point 16 toward exit duct 18, comprises hot flue gas containing a suspension of fly ash, lime, calcium sulfate, and the relatively coarse oxidation catalyst particles. These latter particles, because of their higher terminal velocity, tend to drop out to duct 46, whereas the much finer particles of fly ash, calcium sulfate, and a minor portion of unreacted lime are carried in the flue gas to duct 18, for ultimate separation in cleanup unit 22. It is possible to insert mechanical size separation, such as a screen, cyclones, or a settling zone in the lower region of the convection zone, so as to separate the coarse from the fine particles and send them in the desired directions, but this is generally not necessary because of the different 'carrying' effect the gas has on the different sizes of particles, as discussed.

The high reactivity and resulting high calcium utilization of this process require a relatively low calcium:-sulfur molar ratio, e.g. of the order of 1.1 or 1.2 to 1. This ratio is most conveniently controlled by varying weigh feeder 60 proportional to the fuel feed rate in conduit 12, with the proportion varying according to the sulfur content of the feed. Because of this high rate of calcium utilization, it will generally be uneconomical to recycle a portion of solids from conduit 26 back to the reaction zone, e.g. to conduit 70, in order to utilize the small unreacted portion of lime. Suitable catalyst circulation rates are from about 0.35 to about 5.0 lb./SCF of $SO_2$. At an average gas velocity of 30 to 35 feet/second, residence time for the gas in the catalytic zone will in a commercial power plant typically be of the order of two seconds. Also, it has recently been determined that some humidification of the stream in duct 18 can be beneficial to the operation of the ESP.

In the FIGURE, the vertical convection section downstream of point 16 is shown to descend, since this is by far the most prevalent boiler geometry. This results in cocurrent flow of catalyst, fly ash, and sorbent solids. However, it is within the scope of this invention for the vertical convection section to turn upwardly, rather than downwardly, at point 16, in which instance the flue gas carries the lime and fly ash upwardly countercurrent to the descending shower of catalyst.

The process of this invention has several advantages over various processes of the prior art. The pressure drop through a showering catalyst reaction zone is quite low, and the tendency of the material to form plugs is also low, with the result that fan horsepower for the stack is kept at a minimum. Also, the system is retrofitted easily to the typical utility boiler and, since no additional reactor zone is required, additional capital cost is minimized. The $SO_3$ is tied up as calcium sulfate quickly and at an elevated temperature, well above the prevailing dew point, which eliminates the chance of sulfuric acid corrosion of the equipment.

The invention will be further illustrated by referring to the following example.

EXAMPLE

An electric utility boiler installation of 600 MW capacity burns Northern West Virginia coal, and produces a flue gas according to the following Table I:

TABLE 1

| Flue Gas from a Northern West Virginia Coal | | | | |
|---|---|---|---|---|
| Basis: 600 MW (net) Utility Boiler | | | | |
| 21% Excess Air (0.006 lb $H_2O$/lb dry air) | | | | |
| 2.65% Sulfur and 14,100 Btu/lb (MF) Coal | | | | |
| 3.76 lb $SO_2$/MM Btu inlet | | | | |
| | INLET (at point 16) | | OUTLET (adjacent duct 18) | |
| Flue Gas | moles/hr (mph) | Mol % | mph | Mol % |
| $CO_2$* | 26,618.23 | 14.02 | 26,618.23 | 14.05 |
| $N_2$* | 143,121.95 | 75.37 | 143,121.93 | 75.55 |
| $O_2$ | 6,573.08 | 3.46 | 6,422.31 | 3.39 |
| $SO_2$ | 332.80 | 0.18 | 31.26 | 0.02 |
| $H_2O$ | 13,240.21 | 6.97 | 13,240.21 | 6.99 |

TABLE 1-continued

Flue Gas from a Northern West Virginia Coal

Basis: 600 MW (net) Utility Boiler
  21% Excess Air (0.006 lb H₂O/lb dry air)
  2.65% Sulfur and 14,100 Btu/lb (MF) Coal
  3.76 lb SO₂/MM Btu inlet

| Flue Gas | INLET (at point 16) moles/hr (mph) | Mol % | OUTLET (adjacent duct 18) mph | Mol % | |
|---|---|---|---|---|---|
| TOTAL | 189,886.27 | 100.00 | 189,433.96 | 100.00 | |
| MSCFM | 1,200.8 | | 1,197.9 | | |
| SO₂ Removal | | | 90.6% | | |
| SO₂ in Stack Gas | | | 0.35 | | lb/mm Btu |

*Includes CO₂ released from calcined limestone

This degree of removal is achieved by showering a vanadium-type catalyst downwardly through the vertical convection portion of a typical boiler, which for the purpose of this example is divided into six temperature zones or sections having the properties shown in Table 2:

TABLE 2

Convection Section Profiles for 600 MW Boiler
Flue Gas Flow = 5,672,950 lb/hr @ 29.87 molecular weight

| VERTICAL CONVECTION SECTION | HEIGHT Ft | GAS TEMP, °C. IN | OUT | AREA# Ft² | $V_S$ IN/OUT FPS | RES. TIME SEC. |
|---|---|---|---|---|---|---|
| 1 | 41.2 | 719 | 637 | 1287.4* | 53.5/49.0 | 0.80 |
| 2 | 6.0 | 637 | 596 | 1828.5** | 34.5/32.9 | 0.18 |
| 3 | 5.5 | 596 | 563 | " | 32.9/31.7 | 0.17 |
| 4 | 5.5 | 563 | 504 | " | 31.7/29.4 | 0.18 |
| 5 | 12.6 | 504 | 493 | " | 29.4/29.0 | 0.43 |
| 6 | 19.3 | 493 | 307 | " | 29.0/22.0 | 0.76 |
| TOTALS | 90.1 | | | | | 2.52 |

Notes:
Cross Sectional Area of Vertical Duct
*Duct Size is 63' × 20.4'
**Duct Size is 63' × 29.0'

The calculations in the following Table 3 show that these conversion results are achievable on the basis of only three stages of conversion within a boiler convection zone similar to the example boiler in Table 2:

TABLE 3

First Stage - Reaction temp = 614° C., kp = 7.8, 0.52 sec. time
$n_{SO_3}^2 = (n_{SO_2}^2)(n_{O_2})(k_pP)/N$
where: n = number of moles of each component, mph (moles per hour)
N = total moles of flue gas, mph
P = total pressure, atm
kp = equilibrium constant
SO₂ @ inlet = 332.8 mph
Assume 112.86 mph converted to SO₃
$n_{SO_3} = [(219.94)^2(6516.65)(7.8)(0.983)/189,716.98]^{\frac{1}{2}} =$ 112.87 mph
Second Stage - Reaction temp = 517° C., kp = 37, 0.61 sec. time
SO₂ @ inlet = 219.94 mph
Assume 115.86 mph converted to SO₃
$n_{SO} = [(104.08)^2(6458.72)(37)(0.983)/189,543.19]^{\frac{1}{2}} = 115.87$ mph
Third Stage - Reaction temp = 443° C., kp = 163, 0.76 sec. time
SO₂ @ inlet = 104.08 mph
Assume 72.82 mph converted to SO₃
$n_{SO_3} = [(31.26)^2(6422.31)(163)(0.983)/189,433.96] = 72.86$ mph
Overall conversion = (112.86 + 115.87 + 72.83)(100)/332.8 = 90.6%

Although the invention has been discussed in connection with combustion of sulfur-containing coal, it is also applicable to treatment of flue gases resulting from burning oil containing sulfur compounds.

Reasonable variation and modification are possible within the scope of the foregoing disclosure and the appended claims to my invention, the essence of which is that I have provided an improved method for reducing the sulfur dioxide content of flue gas by catalyzed oxidation to sulfur trioxide in the presence of sorbent.

I claim:

1. The method of reducing sulfur dioxide content of flue gas generated by combustion of sulfur-containing fuel which comprises:
   (a) passing said flue gas containing molecular oxygen at a temperature of at least about 415° C. into a first end of a vertically elongated boiler convection zone;
   (b) introducing into an upper end of said boiler convection zone a shower of dry particulate oxidation catalyst, said catalyst passing through said boiler convection zone co-currently with exiting gases;
   (c) removing from a lower end of said boiler convection zone a stream comprising said oxidation catalyst;
   (d) returning a portion of the removed stream of step (c) to the step of introducing in step (b);
   (e) providing finely divided dry lime, quicklime, limestone or dolomite sulfur trioxide getter to said flue gas at a point proximate to said first end of said boiler convection zone; and
   (f) removing from a second end of said boiler convection zone a stream comprising flue gas of diminished sulfur dioxide content carrying a suspension of finely divided reaction product of getter and sulfur trioxide.

2. The method of claim 1 wherein said first end comprises said upper end, and said second end comprises said lower end.

3. The method of claim 1 wherein said first end comprises said lower end, and said second end comprises said upper end.

4. The method of claim 2 wherein said providing of step (e) comprises injecting getter into said flue gas at said point.

5. The method of claim 2 wherein said providing of step (e) comprises injecting calcium carbonate into a region proximate to said combustion.

6. The method of claim 2 wherein said oxidation catalyst is of a size consist primarily larger than about 16 mesh, and said getter is of a size consist primarily smaller than about 200 mesh.

* * * * *